United States Patent
Smith et al.

(10) Patent No.: US 7,792,124 B2
(45) Date of Patent: Sep. 7, 2010

(54) DATA FORWARDING IN A LAYER THREE SATELLITE NETWORK

(75) Inventors: Michael Smith, San Jose, CA (US); Dileep Kumar Devireddy, San Jose, CA (US); Saravanakumar Rajendran, San Jose, CA (US); Jeffrey Ym Wang, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 633 days.

(21) Appl. No.: 11/695,049

(22) Filed: Apr. 1, 2007

(65) Prior Publication Data

US 2008/0240100 A1    Oct. 2, 2008

(51) Int. Cl.
  *H04L 12/56* (2006.01)
(52) U.S. Cl. .................. 370/395.54; 370/351; 370/401; 370/397; 370/399; 370/395.1
(58) Field of Classification Search .................. 370/351, 370/400, 401, 395.1, 396, 397–399, 395.3, 370/395.31, 395.32, 395.5, 395.52, 395.53, 370/395.54, 395.6
See application file for complete search history.

(56) References Cited

U.S. PATENT DOCUMENTS

| | | | |
|---|---|---|---|
| 5,740,171 A | 4/1998 | Mazzola et al. | |
| 6,807,172 B1 | 10/2004 | Levenson et al. | |
| 6,954,463 B1 | 10/2005 | Ma et al. | |
| 7,113,512 B1 * | 9/2006 | Holmgren et al. | 370/395.53 |
| 7,292,569 B1 | 11/2007 | Smith et al. | |
| 7,327,739 B1 * | 2/2008 | Holmgren et al. | 370/395.54 |
| 7,360,086 B1 * | 4/2008 | Tsuchiya et al. | 713/168 |
| 7,415,535 B1 | 8/2008 | Kuik et al. | |
| 7,489,682 B2 * | 2/2009 | Kubota | 370/389 |
| 7,493,562 B2 * | 2/2009 | Kui et al. | 715/736 |
| 7,533,255 B1 | 5/2009 | Dommety et al. | |
| 7,577,142 B2 | 8/2009 | Kloth | |

OTHER PUBLICATIONS

"Hot Standby Router Protocol Features and Functionality," Cisco Systems, Inc., May 25, 2006, pp. 1-14.

* cited by examiner

*Primary Examiner*—Pankaj Kumar
*Assistant Examiner*—Mark A Mais
(74) *Attorney, Agent, or Firm*—Cesari and McKenna, LLP; Michael R. Reinemann

(57) ABSTRACT

Method and system for providing access layer satellite architecture in a data network including receiving a data packet from an access layer network device, the data packet including a Virtual Local Area Network (VLAN) identifier associated with a port on the access layer network device, performing a route lookup procedure based on the received data packet to determine a destination of the data packet, updating an ARP table with a Media Access Control (MAC) address associated with the VLAN identifier and the port of the received data packet, and transmitting the data packet to a destination network device, is disclosed.

15 Claims, 4 Drawing Sheets

DATA FORWARDING IN A LAYER THREE SATELLITE NETWORK

TECHNICAL FIELD

The present disclosure relates generally to providing Layer 3 satellite functionality for access layer ports in a data network.

BACKGROUND

Existing network configuration allows for a cluster of network devices such as routers within a single chassis. More particularly, each linecard may be configured to operate as a separate router. This approach allows software and hardware modularity where each router in the chassis may be configured with a different software and hardware image. This approach also may be configured to scale to a higher level compared to existing network configurations as each router in the chassis may be configured to interact with and handle its own interfaces.

When deployed at the distribution layer, however, the approach described above creates a large number of independent control planes and poses management and administrative burden, and does not allow for all of the linecards at the distribution layer to be controlled by a single control plane. Moreover, the multiple control planes imposes constraints on a satellite network architecture that requires a single control plane over the redundant chassis.

SUMMARY

Overview

A method in particular embodiments may include receiving a plurality of identifiers, receiving a data packet, determining one or more information of a port associated with the received data packet, retrieving an identifier from the plurality of identifiers based on the port information for the received data packet, and associating the retrieved identifier with the received data packet. An apparatus in particular embodiments may include a network device configured to receive a plurality of identifiers, receive a data packet, determine one or more information of a port associated with the received data packet, retrieve an identifier from the plurality of identifiers based on the port information for the received data packet, and associate the retrieved identifier with the received data packet.

These and other features and advantages of the present disclosure will be understood upon consideration of the following description of the particular embodiments and the accompanying drawings.

DETAILED DESCRIPTION

Figure 1:
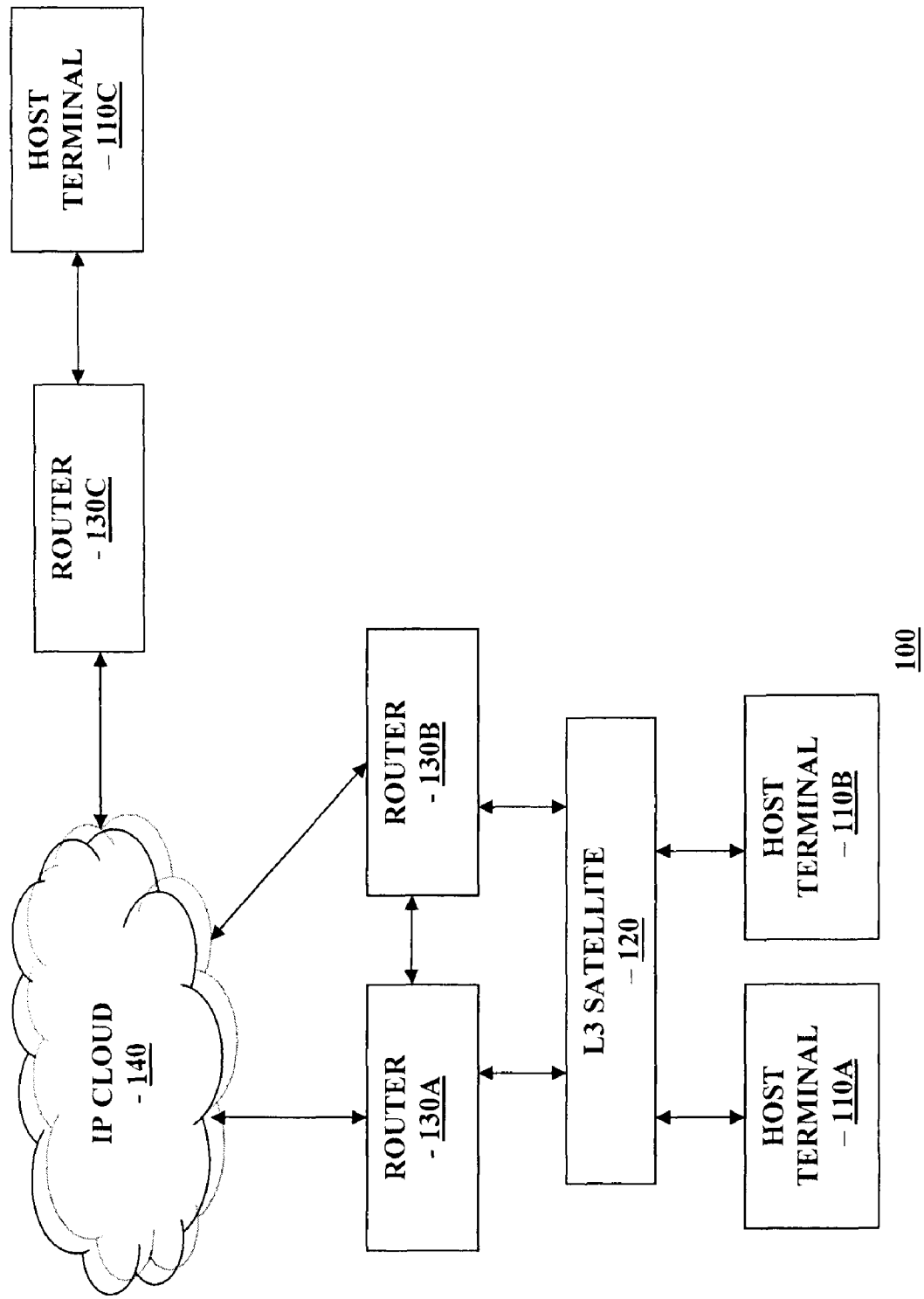
FIG. 1 illustrates an example overall data network for practicing one or more embodiments.

FIG. 1 illustrates an example overall data network for practicing one or more embodiments. Referring to FIG. 1, the data network 100 in particular embodiments of the present invention includes host terminal 110A and host terminal 110B coupled to L3 satellite 120. In particular embodiments, L3 satellite may include layer 2 switches. As further shown in FIG. 1, the L3 satellite 120 is further operatively coupled to Router 130A and Router 130B that are in turn, coupled to Internet Protocol (IP) Cloud 140. In particular embodiments, Router 130A and Router 130B are configured as distribution layer switches.

Referring again to FIG. 1, also shown is host terminal 110C that is operatively coupled to Router 130C which is in turn, operatively coupled to the IP Cloud 140 for data communication. As discussed in further detail below, in particular embodiments, the routers 130A, 130B may be configured to allocate a range of VLAN identification (ID) for each port of the L3 satellite 120 so as to provide a unique VLAN ID for each port of the L3 satellite 120. Moreover, in particular embodiments, where multiple L3 satellites are configured in a network, the VLAN ID assigned by the one or more routers 130A, 130B may include duplicates for the ports of the multiple L3 satellites since the ports may be further distinguished based on the port information by the one or more routers 130A, 130B.

Referring to FIG. 1, when the host terminal 110A transmits one or more data packets to a predetermined port on the L3 satellite 120, and destined for host terminal 110C, the L3 satellite 120 is configured to associate a VLAN tag or identification (ID) associated with the data packet and based on the predetermined port at which the data packet is received and also, the corresponding router that is associated with the VLAN tag. When the return data packet originating from the host terminal 110C is received via router 130C over the IP cloud 140 and router 130A by the L3 satellite 120, the VLAN tag associated with the received data packet is removed before it is forwarded to the host terminal 110A.

More specifically, the data packet below shows an exemplary Ethernet data frame format:

| Destination MAC Address | Source MAC Address | EtherType | Payload |
|---|---|---|---| where the Destination MAC Address field stores the MAC address of the target host terminal, Source MAC address field stores the MAC address of the source host terminal, the Ethertype field storing the associated Ethernet type for the data packet, and the payload field including the substantive data originating from the source host terminal to the destination host terminal.

Referring to FIG. 1, when data packet is originated from host terminal 110A and forwarded to a predetermined port on L3 satellite 120, the data packet includes MAC address and IP address information associated with the host terminal 110A, the destination MAC address and IP address, the Ethertype information, as well as the payload for the data packet. One example of the data packet from the host terminal 110A to the L3 satellite 120 is shown below:

| Dest MAC (r1) | Src MAC (a) | Ethertype (IP) | Src IP (A) | Dest IP (C) | Payload |
|---|---|---|---|---|---| where, the destination MAC address (r1) corresponds to the MAC address of the router 130A to which the data packet is destined, the source MAC address (a) and the source IP address (A) respectively correspond to the MAC address and the IP address of the host terminal 110A sending the data packet, and the destination IP address (C) of the data packet corresponds to the IP address of the host terminal 110C to which the data packet is destined.

Upon receiving the above data packet, the L3 satellite 120 is configured to tag the packet with the VLAN ID (100) corresponding to the predetermined port at which the data packet was received, and thereafter sends the data packet to router 130A that has MAC address (r1) as shown in the data packet destination MAC address field. More specifically, the data packet with the VLAN ID tagged for transmission to the distribution layer router 130A is shown below:

| Dest MAC (r1) | Src MAC (a) | Ethertype (.1Q) | VLAN 100 | Ethertype (IP) | Src IP (A) | Dest IP (C) | Payload |
|---|---|---|---|---|---|---|---| where the Ethertype of 801.1Q trunk associated with VLAN ID 100 tagged to the data packet is shown.

Upon receiving the data packet from L3 satellite 120, the router 130A is configured in particular embodiments to perform a route lookup to find the network entity with IP address of (C) and the associated next hop router, which, as shown in FIG. 1 is router 130C. Moreover, the router 130A is further configured in particular embodiments to build the association in its ARP table of the MAC address of the host terminal 110A with the VLAN tag of 100 on Port R1.1, for example. Thereafter, router 130A is configured in particular embodiments to send the data packet to the next hop router 130C, and example of the data packet shown below:

| Dest MAC (r3) | Src MAC (r1) | Ethertype (IP) | Src IP (A) | Dest IP (C) | Payload |
|---|---|---|---|---|---| where it can be seen that the fields for the destination and source MAC addresses are modified so as to reflect the data packet transmission from the router 130A (with MAC address of (r1)), to the next hop router 130C (with MAC address of (r3)). Thereafter, the router 130C is configured to forward the received data packet to the host terminal 110C having the destination IP address (C). For example, in particular embodiments, the data packet sent from the router 130C to the host terminal 110C is shown below:

| Dest MAC (c) | Src MAC (r3) | Ethertype (IP) | Src IP (A) | Dest IP (C) | Payload |
|---|---|---|---|---|---| where it can be seen that the destination and source MAC addresses of the data packet is modified to reflect the data packet passing from the router 130C (with the MAC address of (r3) to the host terminal 110C (with MAC address of (C)).

Return bound data packet transmission originating from the host terminal 110C and destined for host terminal 110A goes through similar data packet modifications. That is, as shown below, the data packet that is sent from the host terminal 110C to the router 130C includes destination MAC address of the router 130C and the source MAC address of the host terminal 110C as shown below:

| Dest MAC (r3) | Src MAC (c) | Ethertype (IP) | Src IP (C) | Dest IP (A) | Payload |
|---|---|---|---|---|---|

Moreover, as can be seen from the data packet above, since the data packet is originating from host terminal 110C and bound for host terminal 110A, the source IP address of the host terminal 110C (C) is stored in the source IP field, while the destination IP field includes the IP address (A) of the host terminal 10A.

Similar to the outbound data packet transmission to host terminal 110C, in this case, the router 130C is configured to perform a route lookup based on the received data packet above, to determine the next hop router for the destination IP address (A) which, as shown in FIG. 1, is the router 130A. Thus, the MAC address fields for the source and destination for the data packet going from the router 130C to the router 130A is modified to reflect the source and destination MAC addresses of the respective routers 130C and 130A as shown below:

| Dest MAC (r1) | Src MAC (r3) | Ethertype (IP) | Src IP (C) | Dest IP (A) | Payload |
|---|---|---|---|---|---|

Thereafter, upon receiving the above data packet, router 130A is configured to perform a route lookup to determine the intended destination of the data packet associated with the destination IP address (A). Moreover, the router 130A is configured to retrieve from its ARP table information associated with the host terminal 110A IP address (A). For example, as discussed above, ARP table of router 130A in particular embodiments includes the host terminal 110A IP address (A) associated with VLAN ID of 100 and the corresponding port information (Port R1.1).

With the retrieved information, the router 130A is configured to modify the data packet to include the port information and the VLAN ID, which is then provided to the L3 satellite 120. For example, the following data packet is sent from the router 130A to the L3 satellite 120:

| Dest MAC (a) | Src MAC (r1) | Ethertype (.1Q) | VLAN 100 | Ethertype (IP) | Src IP (C) | Dest IP (A) | Payload |
|---|---|---|---|---|---|---|---|

Upon receiving the above data packet, the L3 satellite 120 is configured to send all traffic received on VLAN 100 to Port 1 with the 802.1Q header removed from the data packet. For example, the L3 satellite 120 is configured to forward the following data packet to host terminal 110A which originated from the host terminal 110C:

| Dest MAC (a) | Src MAC (r1) | Ethertype (IP) | Src IP (C) | Dest IP (A) | Payload |
|---|---|---|---|---|---|

Referring back to FIG. 1, each front panel port of the L3 satellite 120 is assigned a predetermined VLAN, and 802.1Q trunk is used between the L3 satellite 120 and the router 130A (for example). Also, each router may support up to approximately 4,000 L3 interfaces which may be either remote or local.

Figure 2:
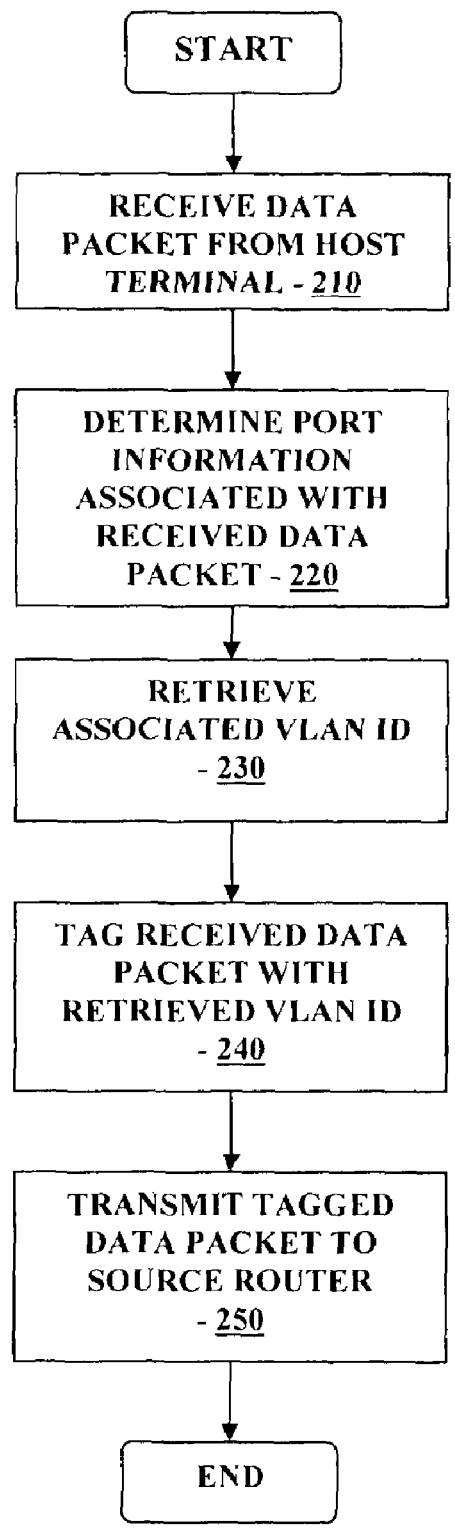
FIG. 2 is an example method for the data packet flow from the source host terminal to the access layer in the data network illustrated in FIG. 1.

FIG. 2 is an example method for the data packet flow from the source host terminal to the access layer in the data network illustrated in FIG. 1. Referring to FIG. 2, in particular embodiments of the present invention, data packet from host terminal 110A is received at step 210 by the L3 satellite 120 (for example, at a predetermined port on the L3 satellite 120). Thereafter, at step 220, the port information associated with the received data packet is determined at step 220. After determining the port information associated with the received data packet, at step 230 a predetermined VLAN identification (VLAN ID) for the received data packet and associated with the determined port information is retrieved.

Referring back to FIG. 2, the received data packet is tagged with the retrieved VLAN ID at step 240, and thereafter, at step 250, the data packet tagged with the retrieved VLAN ID is transmitted to the source router. For example, referring back to FIG. 1, in particular embodiments, the data packet received from host terminal 110A is tagged with the retrieved VLAN ID and transmitted to the router 130A.

Figure 3:
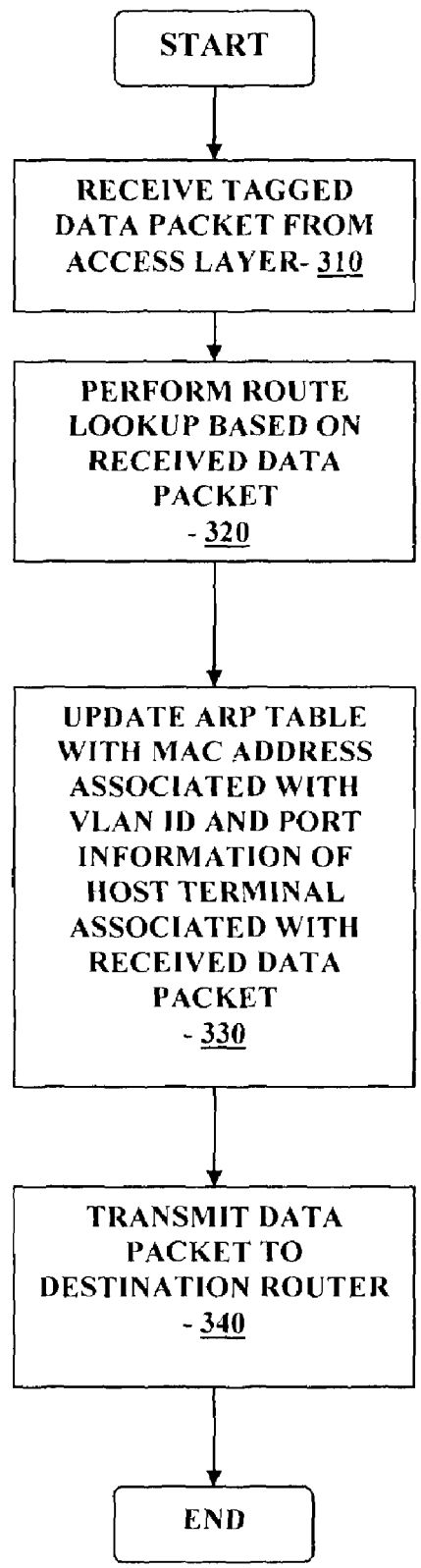
FIG. 3 is an example method for the data packet flow from the access layer to the source router in the data network illustrated in FIG. 1.

FIG. 3 is an example method for the data packet flow from the access layer to the source router in the data network illustrated in FIG. 1. Referring to FIG. 3, in particular embodiments, at step 310, the data packet tagged with the VLAN ID from access layer (for example, the L3 Satellite 120) is received and thereafter, a route lookup is performed at step 320 based on the received data packet tagged with VLAN ID as discussed above in conjunction with FIG. 1, for example.

Referring again to FIG. 3, after performing route lookup based on based on the received tagged data packet at step 320, an ARP table is updated with MAC address associated with the VLAN ID and port information of the host terminal associated with the received tagged data packet. Thereafter, at step 340, the data packet is transmitted to a destination router.

For example, referring to FIG. 1, in particular embodiments, the router 130A may be configured to update the ARP table with the address associated with the VLAN ID and port information of the host terminal 110A which transmitted the data packet. Thereafter, the router 130A may be further configured to transmit the tagged data packet to the destination router 130C over the IP Cloud 140.

Figure 4:
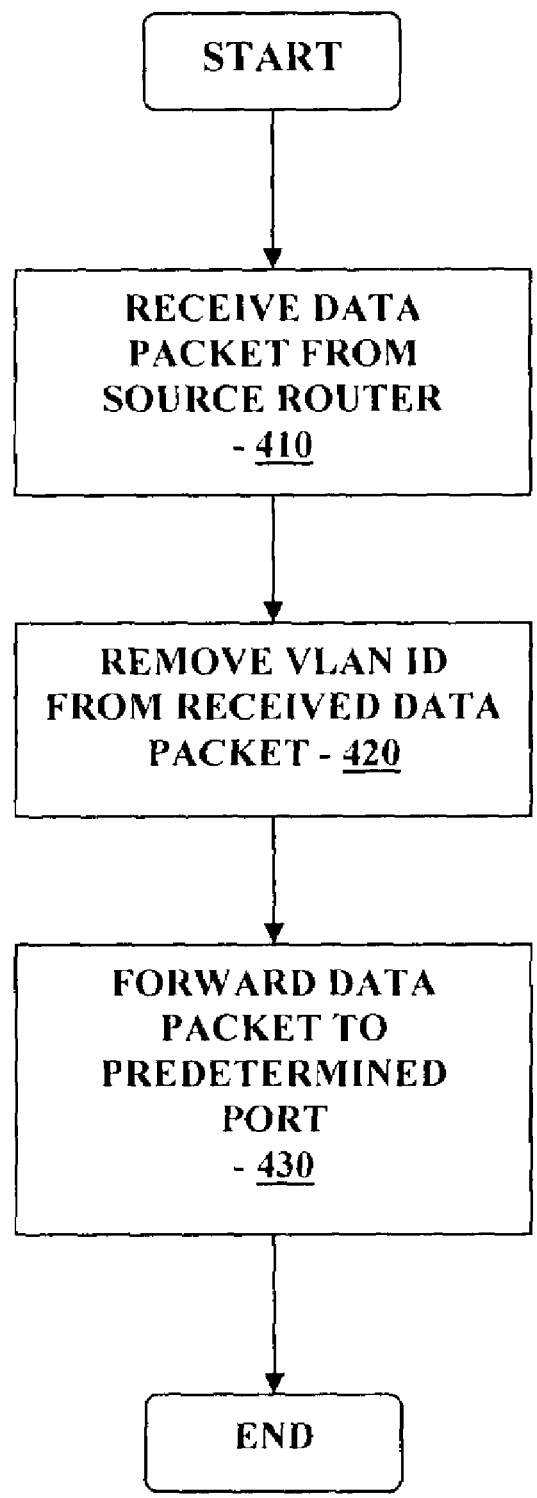
FIG. 4 is an example method for data packet flow from the source router to the access layer for forwarding to the source host terminal in the data network illustrated in FIG. 1.

FIG. 4 is an example method for data packet flow from the source router to the access layer for forwarding to the source host terminal in the data network illustrated in FIG. 1. Referring to FIG. 4, in particular embodiments, the tagged data packet originating from the source router is received at step 410, and thereafter, the VLAN ID is removed from the received data packet at step 420. Thereafter, the received data packet with the VLAN ID removed is forwarded to the predetermined port operatively coupled to the host terminal 110A for which the received data packet is intended.

For example, in particular embodiments, the L3 Satellite 120 is configured to receive data packet from source router 130A that has received the data packet from the destination router 130C operatively coupled to the host terminal 110C. Thereafter, the L3 Satellite 120 is configured in particular embodiments to remove the VLAN ID associated with the received data packet, and to forward the received data packet without the VLAN ID to the host terminal 110A via the predetermined port.

In the manner described above, in accordance with the particular embodiments, given satellite network architecture, each front panel port is assigned to a unique VLAN. The interfaces connected to the distribution layer are set up as 802.1Q trunks. At the distribution layer, each router may be paired with a peer router on the redundant chassis. The L3 satellite 120 may be detected using an inband communication across the uplink and reports its number of interfaces to the routers. The routers (for example, routers 130A, 130B) are configured in particular embodiments to coordinate between themselves and allocate a range of VLANs for the L3 satellite 120. The L3 satellite 120 may be configured to program the ports accordingly. That is, the L3 satellite 120 may be provided with a MAC table that contains a static entry for the Hot Standby Routing Protocol/Virtual Router Redundancy Protocol (HSRP)/(VRRP) destination MAC address. This allows HSRP/VRRP to be used between the routers connected to the L3 satellite 120. The HSRP/VRRP active router may be configured to program the virtual MAC address to point its uplink through communication with the L3 satellite processor (CPU) using a predetermined destination multicast MAC address which is also stored in the MAC table.

Both the controlling routers will be configured to program their MAC addresses into the L3 satellite through the processor (CPU) communication. Upon receiving a data packet from the front panel port, the data packet is tagged with the VLAN assigned to the port. The destination MAC address is then compared to the MAC addresses in the MAC table, and the appropriate uplink will be selected. When the data packet is transmitted on the uplink, the data packet is encapsulated with the VLAN assigned at the ingress port.

In particular embodiments, a physical connection link may be provided between router 130A and router 130B, or alternatively, a static MAC address may be provided at the L3 satellite 120 which may be configured to link router 130A and router 130B, such that router 130A and router 130B may be configured to communicate with each other. In particular embodiments, using HSRP/VRRP or other types of keep alive packets, each of the router 130A and router 130B may detect failure mode of the other router. When such a failure mode of one of the routers 130A, 130B is detected by the other one of the routers 130A, 130B, using the existing HSRP/VRRP, for example, the ports for the one of the routers 130A, 130B in the failure mode may be assigned to the active one of the routers 130A, 130B over the static MAC address at the L3 satellite 120. In this manner, in particular embodiments, the routers 130A, 130B may be configured to remotely configure the L3 satellite 120, that is, to update the MAC table in the L3 satellite 120 to point the data traffic to the active one of the routers 130A, 130B in the case where one of the routers 130A, 130B fails.

In this manner, in particular, redundancy may be provided through HSRP/VRRP between the routers and having the routers reconfiguring the L3 satellite 120 MAC table upon switchover. Moreover, load sharing may also be handled through the use of, for example, Gateway Load Balancing Protocol (GLBP) and having the active HSRP/VRRP router program the additional virtual MAC address into the L3 satellite's MAC table. In this manner, interface events may be relayed from the L3 satellite 120 to the distribution layer switch through processor to processor communication.

Moreover, in particular embodiments, the L3 satellite provides access layer L3 ports with minimum software intelligence on the access switch, simple hardware implementation, and also benefits from the satellite configuration with switching decisions performed in the distribution layer thereby reducing the number of network management points in the data network. In particular embodiments, there are provided methods and systems for providing access layer L3 ports with minimal software configuration on the access switches, with the switching and routing decisions performed in the distribution layer in satellite network architecture. Accordingly, centralized network management of the L3 satellite 120 (FIG. 1) may be achieved by the one or more routers 130A, 130B, which may be configured to remotely manage the L3 satellite 120, for example, by assigning and providing the ranges of valid VLAN IDs for the ports of the L3 satellite 120.

A method in particular embodiments include receiving a data packet from an access layer network device, the data packet including a Virtual Local Area Network (VLAN) identifier associated with a port on the access layer network device, performing a route lookup procedure based on the received data packet to determine a destination of the data packet, updating an ARP table with a Media Access Control (MAC) address associated with the VLAN identifier and the port of the received data packet, and transmitting the data packet to a destination network device.

In one aspect, updating the ARP table further may include updating the ARP table with one or more information of the data port associated with the received data packet.

Also, the route lookup procedure may include determining the IP address of the next hop route path for the data packet.

In a further aspect, transmitting the data packet may include transmitting the data packet to a distribution layer switch.

The VLAN identifier for the port may be unique.

In yet another aspect, the method may also include removing the VLAN identifier from the data packet.

An apparatus in accordance with another aspect of the present disclosure includes a network interface, one or more processors coupled to the network interface, and a memory for storing instructions which, when executed by the one or more processors, causes the one or more processors to receive a data packet from an access layer network device, the data packet including a Virtual Local Area Network (VLAN) identifier associated with a port on the access layer network device, performing a route lookup procedure based on the received data packet to determine a destination of the data packet, updating an ARP table with a Media Access Control (MAC) address associated with the VLAN identifier and the port of the received data packet, and transmit the data packet to a destination network device.

The memory for storing instructions which, when executed by the one or more processors, may cause the one or more processors to update the ARP table with one or more information of the data port associated with the received data packet.

In another aspect, the memory for storing instructions which, when executed by the one or more processors, may cause the one or more processors to determine the IP address of the next hop route path for the data packet.

Moreover, the memory for storing instructions which, when executed by the one or more processors, may cause the one or more processors to transmit the data packet to a distribution layer switch.

An apparatus in accordance with yet another aspect of the present disclosure may include means for receiving a data packet from an access layer network device, the data packet including a Virtual Local Area Network (VLAN) identifier associated with a port on the access layer network device, means for performing a route lookup procedure based on the received data packet to determine a destination of the data packet, means for updating an ARP table with a Media Access Control (MAC) address associated with the VLAN identifier and the port of the received data packet, and means for transmitting the data packet to a destination network device.

The means for updating the ARP table may further include means for updating the ARP table with one or more information of the data port associated with the received data packet.

Also, the route lookup procedure may include means for determining the IP address of the next hop route path for the data packet.

Additionally, the means for transmitting the data packet may include means for transmitting the data packet to a distribution layer switch.

The various processes described above including the processes performed by host terminals 110A, 110B, 110C, L3 Satellite 120, or routers 130A, 130B, and 130C in the software application execution environment in the data network 100 including the processes and routines described in conjunction with FIGS. 2-4, may be embodied as computer programs developed using an object oriented language that allows the modeling of complex systems with modular objects to create abstractions that are representative of real world, physical objects and their interrelationships. The software required to carry out the inventive process, which may be stored in the memory (not shown) of the host terminals 110A, 110B, 110C, L3 Satellite 120, or routers 130A, 130B, and 130C may be developed by a person of ordinary skill in the art and may include one or more computer program products.

Various other modifications and alterations in the structure and method of operation of the particular embodiments will be apparent to those skilled in the art without departing from the scope and spirit of the disclosure. Although the disclosure has been described in connection with specific particular embodiments, it should be understood that the disclosure as claimed should not be unduly limited to such particular embodiments. It is intended that the following claims define the scope of the present disclosure and that structures and methods within the scope of these claims and their equivalents be covered thereby.

What is claimed is:

1. A method, comprising:
    receiving, at a port of a distribution layer router that is coupled to an access layer network device, a data packet from the access layer network device, the data packet including a Virtual Local Area Network (VLAN) identifier that is associated with a port on the access layer network device at which the data packet was received from a host, the data packet further including a Media Access Control (MAC) address of the host;
    performing, at the distribution layer router, a route lookup procedure based on the received data packet to determine a destination of the data packet;
    updating an ARP table, stored at the distribution layer router, with the MAC address of the host, the VLAN identifier of the data packet and the port of the distribution layer router on which the data packet was received from the access layer network device;
    removing the VLAN identifier from the data packet; and
    transmitting the data packet with the VLAN identifier removed from the distribution layer router to a destination network device.

2. The method of claim 1 wherein updating the ARP table further includes
    updating the ARP table with one or more information of the data port associated with the received data packet.

3. The method of claim 1 wherein the route lookup procedure includes determining the IP address of the next hop route path for the data packet.

4. The method of claim 1 wherein transmitting the data packet includes transmitting the data packet to a distribution layer switch.

5. The method of claim 1 wherein the VLAN identifier that is associated with the port of the access layer network device is uniquely assigned by the distribution layer router.

6. An apparatus, comprising:
a plurality of ports;
one or more processors coupled to the ports; and
a memory for storing instructions which, when executed by the one or more processors, causes the one or more processors to
receive a data packet, at one of the ports, from an access layer network device managed by the apparatus, the data packet including a Virtual Local Area Network (VLAN) identifier that is associated with a port on the access layer network device at which the data packet was received from a host, the data packet further including a Media Access Control (MAC) address of the host,
perform a route lookup procedure based on the received data packet to determine a destination of the data packet,
update an ARP table with the MAC address of the host, the VLAN identifier of the data packet and the port of the apparatus on which the data packet was received from the access layer network device, and
transmit the data packet to a destination network device.

7. The apparatus of claim 6 wherein the memory for storing instructions which, when executed by the one or more processors, causes the one or more processors to update the ARP table with one or more information of the data port associated with the received data packet.

8. The apparatus of claim 6 wherein the memory for storing instructions which, when executed by the one or more processors, causes the one or more processors to determine the IP address of the next hop route path for the data packet.

9. The apparatus of claim 6 wherein the memory for storing instructions which, when executed by the one or more processors, causes the one or more processors to transmit the data packet to a distribution layer switch.

10. The apparatus of claim 6 wherein the memory for storing instructions which, when executed by the one or more processors, causes the one or more processors to uniquely assign the VLAN identifier to the port of the access layer network device.

11. An apparatus, comprising:
means for receiving, at a port of the apparatus, a data packet from an access layer network device, the data packet including a Virtual Local Area Network (VLAN) identifier that is associated with a port on the access layer network device at which the data packet was received from a host, the data packet further including a Media Access Control (MAC) address of the host;
means for performing a route lookup procedure based on the received data packet to determine a destination of the data packet;
means for updating an ARP table with the MAC address of the host, the VLAN identifier of the data packet, and the port on which the data packet was received from the access layer network device;
means for removing the VLAN identifier from the data packet; and
means for transmitting the data packet with the VLAN identifier removed to a destination network device.

12. The apparatus of claim 11 wherein means for updating the ARP table further includes means for updating the ARP table with one or more information of the data port associated with the received data packet.

13. The apparatus of claim 11 wherein the route lookup procedure includes means for determining the IP address of the next hop route path for the data packet.

14. The apparatus of claim 11 wherein means for transmitting the data packet includes means for transmitting the data packet to a distribution layer switch.

15. The apparatus of claim 11 wherein the VLAN identifier that is associated with the port of the access layer network device is uniquely assigned by the apparatus.

* * * * *

UNITED STATES PATENT AND TRADEMARK OFFICE
CERTIFICATE OF CORRECTION

PATENT NO. : 7,792,124 B2  Page 1 of 1
APPLICATION NO. : 11/695049
DATED : September 7, 2010
INVENTOR(S) : Michael Smith et al.

It is certified that error appears in the above-identified patent and that said Letters Patent is hereby corrected as shown below:

Col. 4, Line 14, please amend as shown:

terminal 110A

Signed and Sealed this

Sixteenth Day of November, 2010

David J. Kappos
*Director of the United States Patent and Trademark Office*